United States Patent [19]

Mathieu et al.

[11] 4,398,290

[45] Aug. 9, 1983

[54] PROCESS AND APPARATUS FOR DIGITAL DATA COMMUNICATION USING PACKET SWITCHING

[75] Inventors: Michel Mathieu; Pierre Charbonnel, both of Betton; Jean-Claude Pacaud, Rennes, all of France

[73] Assignees: Centre National d'Etudes des Telecommunications; Etablissement Public de Diffusion dit Telediffusion de France, both of France

[21] Appl. No.: 270,623

[22] Filed: Jun. 4, 1981

[30] Foreign Application Priority Data

Jun. 6, 1980 [FR] France .............................. 80 12672

[51] Int. Cl.³ .................... H04L 11/20; H04J 6/02; G06F 11/00
[52] U.S. Cl. .................................................. 370/94
[58] Field of Search ................... 370/60, 94, 43, 105; 371/31

[56] References Cited

U.S. PATENT DOCUMENTS

| | | |
|---|---|---|
| 2,570,505 | 10/1951 | Watson . |
| 4,100,377 | 7/1978 | Flanagan .............................. 370/94 |
| 4,291,405 | 9/1981 | Jayant et al. ........................ 371/31 |

FOREIGN PATENT DOCUMENTS

| | | |
|---|---|---|
| 2118888 | 4/1972 | France . |
| 2313825 | 12/1976 | France . |
| 54-141504 | 11/1979 | Japan . |
| 55-140347 | 11/1980 | Japan . |

*Primary Examiner*—Thomas A. Robinson
*Attorney, Agent, or Firm*—Larson and Taylor

[57] ABSTRACT

The consequences of the loss of a packet are attenuated in a digital data communication apparatus using packet switching by structuring the digital data as multibit words into frames having a fixed length l and assembling the frames into packets all having the same predetermined length $L=kl$, where k is a predetermined integer. Continuity index words incremented by one each time a new frame or packet is assembled may be located into the frame locking word or the packet prefix. Then the number of packets which are lost may be determined at the receiver location by monitoring the successively received index words. When the digital data represent successive samples which are correlated, for instance when such samples represent a sound, substitution data may be generated at the receiver location and used in place of the missing data.

6 Claims, 8 Drawing Figures

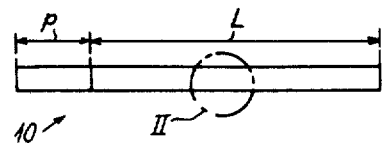
FIG.1
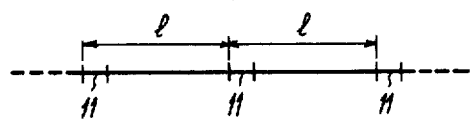
FIG.2
FIG.3
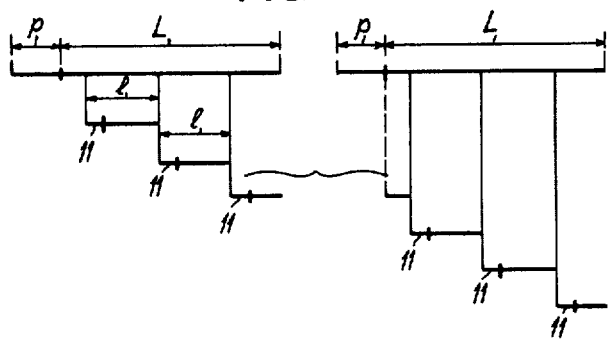
FIG.5
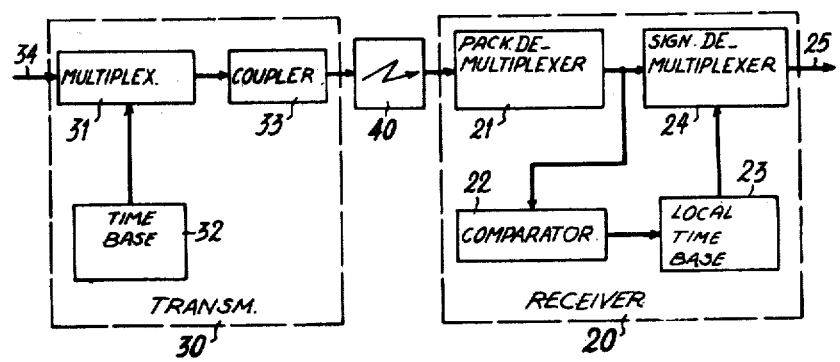

PROCESS AND APPARATUS FOR DIGITAL DATA COMMUNICATION USING PACKET SWITCHING

BACKGROUND AND SUMMARY OF THE INVENTION

The invention relates to digital communication using packet switching and is particularly, but not exclusively, suitable for use in networks for transmission and diffusion of digital data representing sound signals, such as voice and high fidelity mono- and stereo-sounds.

While commercial development of packet switching networks is relatively recent, the general architecture and construction of such networks are well known and will not be described here. The techniques of data insertion, dynamic allocation, and data recovery used in transmission (i.e. communication between two well defined stations) and broadcast (i.e. between a sender and any number of receivers) are also well known and need not be repeated here in detail. If necessary, reference may be had to such documents as French Pat. No. 2,313,825; "Revue de Radiodiffusion Télévision", No. 40, Nov.-Dec. 1975 and No. 60, Nov.-Dec. 1979; and "Electronics", Dec. 20, 1979, pp. 89 seq.

The first step in the communication process comprises distributing the digital data into "packets", consisting of an opening part, called the prefix p, and an information useful part. The prefix provides indications defining the structure of the useful part. The useful part comprises a short length fraction of the message, which consists of a sequence of words each having x bits and representing the signal to be transferred. When the data are sound signals, the words typically each represent a quantized sample in digital form.

Reconstitution at the receiver is achieved by assembling a fixed predetermined number of words to form a unit which may be called a "digital frame", having a constant length l, having an opening portion consisting of a word of particular and identifiable construction, which will be called "frame lock word". That lock word makes it possible for the receiver to break up the received sequence into x-bit words correctly. The sequence includes the frame lock word at evenly distributed intervals.

The advantages of packet switching are known: each packet is an autonomous entity. Routing is transparent to the users and to the system used for transmission, storing and/or broadcasting the sequence of digital data. If the communication network has several alternative routes, packet switching leads to optimum use of the network capacity.

On the other hand, the data insertion techniques which are in present use (in which the only limitation is in respect of the maximum number of bits in a packet) result in a loss of continuity in the digital service if a packet is lost. Such a loss of a packet, related for instance to a faulty recovery of the data in the prefix, results in the loss of all data in the useful part of the packet. Since the length of the useful part is variable, the loss of a packet frequently results into a change of the periodical repetition of the digital sequence. The receiver detects an incorrect phase of the frame lock word with respect to its local clock. A resynchronisation procedure which implies searching for a structure corresponding to the frame lock word is necessary and the communication is broken during the search.

It is an object of the invention to improve upon the prior art packet data communication systems. It is a more particular object to reduce the loss of continuity in the service resulting from loss of a packet. For that purpose, the invention removes the need for a search of re-synchronization and timing by providing the data insertion device at said sender location with means for structuring the data as multibit words into frames having a fixed length l and each preceded with a frame lock word of identifiable constitution; and assembling said frame into short packets all having the same predetermined length L, with $L = kl$, where k is a predetermined integer programmed at said sender location and receiver location.

The arrangement of digital data in short packets having a fixed length L is rendered possible by implicitly programming the format of the packets in the multiplexer and demultiplexer provided for sending and receiving data, i.e. at both ends of the communication link (the word "implicit" meaning predetermined at both ends without any requirement for transmission and/or acknowledgment of commands prior to data transmission).

The above defined construction makes it possible to avoid any loss of information in addition to that contained in the useful part of the lost packet(s). The number of lost packets may be determined by inserting a continuity index word into the prefix of each packet or into the frame locking word at the sender location and then checking the continuity of the index words upon reception of the packets.

According to an ancillary object of the invention, when there is a certain amount of correlation between successive words, substitution words are generated in replacement of the lost words. The substitution words may be generated using as a basis the words before and after the lost words. Such an approach may particularly be used when the words represent successive samples of a sound signal. For that purpose, the process takes advantage of the fact the number of missing words may be computed, since each frame has a constant number of words and the lost packet has a constant and known number of frames (which however may be so assembled that a packet contains part only of the first and last frames).

The words, i.e. samples, which are generated and reinserted upon packet disassembly in the receiving facility or terminal are used to mitigate the effects of the loss of continuity in communication. If a single short packet, having k frames of each n words each representing a sample are lost, n·k samples are generated and inserted between the last sample N received before the communication is broken and the first sample $N + nk + 1$ received after recovery.

According to another aspect of the invention, there is provided a process for digital data communication through a packet switching network, comprising: structuring the data into successive frames having a predetermined fixed length l; assembling the frames into packets all of them having the same fixed predetermined implicit format with a predetermined length L of the useful part of said packets with $L = kl$, k being a predetermined integer; inserting a continuity index word into the prefix of each packet or into the frame locking word of each frame; incrementing said index word by one each time a new packet or frame is assembled for transmission; transmitting said packets; and monitoring continuity of the index words upon reception of the packets prior to disassembly of the packets, said frames having a random location in said packets.

Particular embodiments of the invention will now be described by way of examples; since however the system may consist of individual electronic circuits of conventional nature, the block diagrams only will be fully defined.

SHORT DESCRIPTION OF THE DRAWINGS

FIG. 1 is a diagram illustrating the general structure of a packet;

FIG. 2 indicates the overall structure of a digital service frame comprising a frame lock word;

FIG. 3 illustrates how a message is broken up into short packets, according to the invention;

FIGS. 4A and 4B schematically illustrate the consequences of the loss of a packet in a system according to the invention;

FIG. 5 is a simplified block diagram of a communication apparatus according to the invention;

DETAILED DESCRIPTION OF PARTICULAR EMBODIMENTS

Before the invention is described, it may be useful to review some features regarding insertion of digital data for packet switching communication.

Referring to FIG. 1, each independent packet comprises a prefix of length p and a useful part of length L. The useful part is a sequential arrangement of successive digital frames whose length l is constant in the process of the invention. Each frame includes a fixed and predetermined number n of words each consisting of x bits. It will be assumed that analog data are to be communicated; then each word is a representation of a sample of the analog data. Each frame has an opening portion consisting of a frame lock word 11 which enables the receiving terminal to disassemble the received sequence.

According to the invention, packet assembly is carried out for giving the same useful length L to all packets and the digital service structures are arranged as frames whose length l is related to L by a relation of the type $L=kl$ (where k is a fixed predetermined integer).

As an example, there is shown in FIG. 3 a message structure corresponding to $k=3$, other values being acceptable. It will be appreciated that it is not necessary that the beginning of the useful part, of length L, corresponds to the beginning of a frame for service. It is consequently not necessary to arrange the packet assembly means for operation in time synchronism with the equipment which delivers the service data.

Figure 4A:
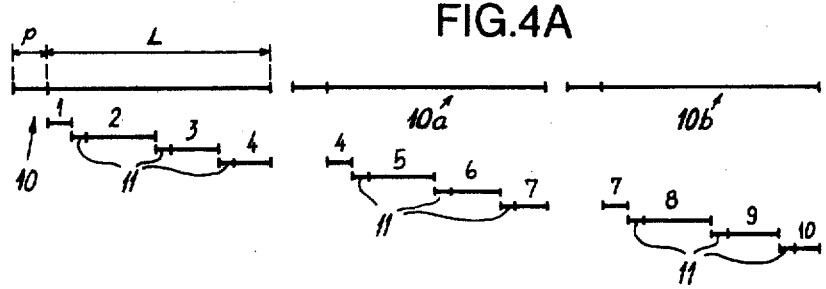
Figure 4B:
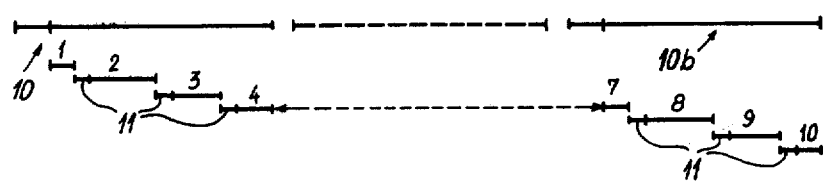

Referring again to FIG. 3, the frame lock words 11 have the same location in each of the successive packets. A comparison between FIGS. 4A and 4B makes it clear that, upon loss of a packet 10a, the time synchronization of the frame lock word is not lost. The frame lock word 11 of frame No. 8 appears after the frame lock word of frame No. 4, after a time delay which is a multiple of the repetition period of the lock word in a packet.

Referring now to FIG. 5, there is shown the general arrangement of a communication apparatus for carrying out the invention. The apparatus comprises a transmitter terminal 30 and a receiver terminal 20. The packets delivered by the transmitter or sender terminal 30 are fed in sequence to the receiver 20 through a communication network which may be of any type. That network can include:

a transmitter, a digital data transmission line and a receiver;

a broadcasting transmitter connected to one or more broadcasting receivers by wire or radio means;

a recorder which delivers a physical data bearing support which is later used on a reading apparatus.

The communication network may include a plurality of nodes which have a store and forward capability and allocate the available circuits dynamically depending upon the received packets destination.

In transmitter terminal 30, the digital signal which is applied at input 34 is inserted by a multiplexer 31 into the frame structure defined by a time base or clock 32. The length l of the frame is a sub-multiple of the length L of the useful part of the packets. The digital sequence which appears at the output of multiplexer 31 is applied to a coupler 33 which assembles the data into packets. The packets are applied to a channel or network 40 for transmission broadcasting or recording.

The receiver terminal 20, which is connected to the output of a network terminal, a broadcasting receiver or a record reader constituting the output unit of channel 40, receives the digital signal. The input unit of the receiver terminal 20 consists of a packet demultiplexer 21 which disassembles the packets and only delivers the useful digital sequence to the input of a comparator 22 which searches for the configuration of the frame lock word in the sequence. That configuration is stored in a memory built in the comparator 22. The comparator finds that configuration at even intervals, equal to the length l of each frame, under normal condition. Each time the comparator finds the word, it delivers a rephasing pulse to a local or output time base 23. The time base 23 sends periodical signals to a signal demultiplexer 24 which receives the digital data from demultiplexer 21 on a data input. The recovered digital data appear on output 25.

Since the loss of a packet results in the loss of a predetermined and fixed number of frames, there is no periodicity change. The comparator 22 will find the frame lock word again at a time which will be delayed by the period only. Consequently, no search will be necessary.

Figure 6:
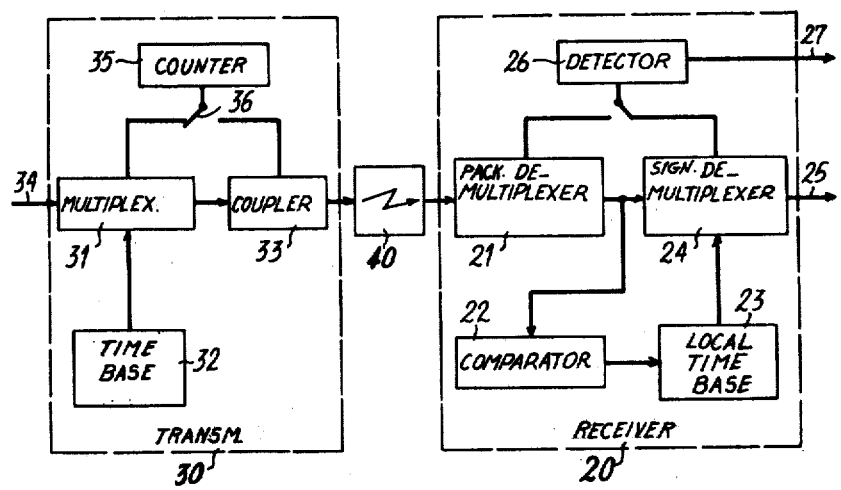
FIG. 6 is a simplified block diagram of a modified embodiment including means for inserting and monitoring continuity index words.

In the embodiment illustrated in FIG. 5, the loss of a packet results in a data loss which is not mitigated. In the embodiment of FIG. 6, means are provided which give an indication of the number of packets which were lost, and consequently the damage caused to communication. It additionally includes means for reducing the consequences of such damage.

In the apparatus of FIG. 6, where the units corresponding to those in FIG. 5 are designated by the same reference numbers, additional components have been provided and include:

means associated with the transmitter terminal 30 for inserting a continuity index word which is incremented by one each time a new packet or frame is delivered, means associated with the receiver terminal 20 for detecting ruptures in the incrementation sequence.

The transmitter terminal 30 comprises an incrementation counter 35 which generates a continuity index. Separate means, which are schematically represented by a switch 36, make it possible to insert the index either into the frame multiplexer 31 whereby an index word is inserted into each frame, or into coupler 33 whereby the index is inserted into each prefix.

In receiver 20, the continuity index is read out either by the packet demultiplexer 21 (if associated with the prefix), or by the demultiplexer 24 (if associated with the frame). The index is compared with the continuity index received immediately beforehand in a continuity break detector 26. Any incrementation break, which is confirmed by comparison with the next continuity index supplied by the demultiplexer 21 or 24, generates an alarm at an output 27.

When the digital data are representative of an analog signal, the successive samples of which are correlated, the detrimental effects of packet loss may be attenuated by generation of samples which are substituted for the missing sample(s). Thus, when the loss of n packets occurs, nK samples are generated which are inserted between the last sample N received before loss and the first sample N+nK+1 received after restoration.

By way of example, it will be assumed that each word of x bits represents a digital sound signal sample. Each sample is the quantized value of an analog value measured at time intervals distributed at a sampling frequency. Each sample has a sign S defined by a bit (for example S=0 if the sample is positive, S=1 if the sample is negative) and an absolute value representing its amplitude A, defined by a byte of $n_A$ bits. Thus the sample of serial number i will be represented by the doublet $(S_i, A_i)$.

Numerous reconstitution algorithms may be used; an example will be given, which requires a circuit of relatively simple construction only and however provides satisfactory results.

It will be assumed that nK samples between samples N and N+nL+1 are to be generated.

Sample N+1 will be represented by the doublet:

$$\begin{cases} S_{N+1} = \overline{S_N} \\ A_{N+1} = \dfrac{A_N}{2} \text{ (modulo 2)} \end{cases}$$

Sample N+2 will be represented by:

$$\begin{cases} S_{N+2} = S_N \\ A_{N+2} = \dfrac{A_N}{2} \text{ (modulo 2)} \end{cases}$$

Sample N+(nk/2) will be equal to:

$$\left( S_N + \dfrac{nk}{2} = \begin{cases} S_N \text{ if } \dfrac{nk}{2} \text{ is even} \\ \overline{S_N} \text{ if } \dfrac{nk}{2} \text{ is uneven} \end{cases} \quad A_N + \dfrac{nk}{2} = \dfrac{A_N}{2^{\frac{nk}{2}}} \right)$$

The sample N+(nk/2)+1 will be equal to $$\left( S_N + \dfrac{nk}{2} + 1 = \begin{cases} S_{N+nk+1} \text{ if } \dfrac{nk}{2} \text{ is even,} \\ \overline{S_{N+nk+1}} \text{ if } \dfrac{nk}{2} \text{ is uneven,} \end{cases} \right.$$

-continued $$\left. A_N + \dfrac{nk}{2} + 1 = \dfrac{A_{N+nk+1}}{2^{\frac{nk}{2}}} \right)$$

The sample N+nk−1 will be equal to:

$$\left( S_{N+nk-1} = S_{N+nk+1}, A_N = nk - 1 = \dfrac{A_{N+nk+1}}{2^2} \right)$$

The sample N+nk will be equal to:

$$\left( S_{N+nk} = S_{N+nk+1}, A_{N+nk} = \dfrac{A_{N+nk+1}}{2} \right).$$

This approach may be used whatever the sampling frequency and the quantization used.

Figure 7:
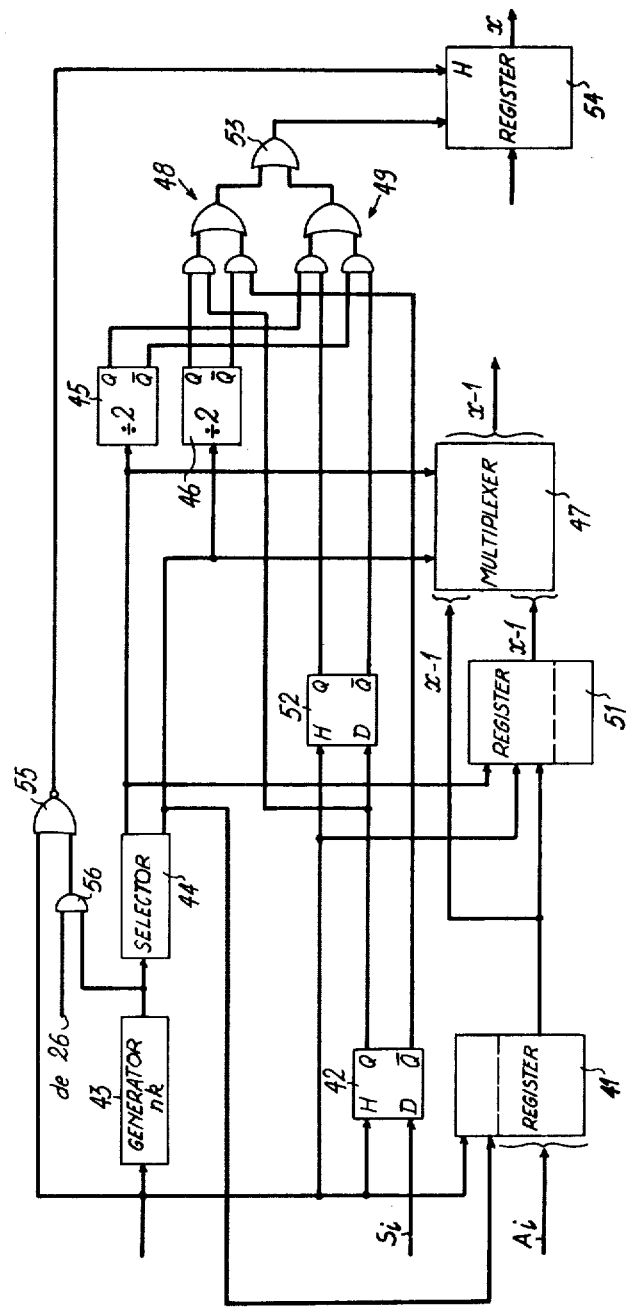
FIG. 7 is a block diagram of a restoration system.

The restoration system incorporated in the receiver may have the construction shown in FIG. 7. It comprises an input memory for temporarily storing each sample in turn. The memory comprises:

a flip-flop 42, connected to receive the bit $S_i$ representative of the sign, a shift register 41, comprising x−1+nk/2 stages, connected so that its x−1 head stages are loaded in parallel by $A_i$ (x designating the number of bits per sample).

A clock signal representative of the sampling timing is applied to the clock input H of flip-flop 42 and to the loading control input of register 41.

Flip-flop 42 and register 41 respectively drive a flip-flop 52 and a shift register 51 having x−1+nk/2 positions. The sample input timing signal is also applied to the clock input of flip-flop 52 and to the loading input of register 51; as a consequence, the contents of flip-flop 42 are stored in flip-flop 52 and the contents of the x−1 lower stages of register 41 are loaded in parallel into the x−1 upper stages of register 51.

The sample timing signal is also applied to a generator 43 which supplies, in response to each timing pulse, nk successive pulses to a selector 44. This selector separates the nk pulses into two trains. The first train formed from the first nk/2 pulses is applied to a divider-by-two 45. The second train, formed from the last nk/2 pulses, is applied to a divider-by-two 46. The first train is also applied to register 51 so as to cause downward shift of the contents of this register. The second train is applied to register 41 and causes upward shift of the contents of this register.

The system also comprises a multiplexer 47 having two sets of x−1 inputs and having x−1 outputs. The inputs of multiplexer 47 are connected to registers 41 and 51 so that the first set of inputs is loaded by the x−1 upper stages of register 41 and the second set of inputs by the x−1 upper stages of register 51. The two outputs of selector 44 are connected to multiplexer 47 so as to separate the first nk/2 pulses from the last nk/2 pulses.

The outputs of storage flip-flops 42 and 52 are connected to two sets of enabling gates 48 and 49, which have the same construction. The set of gates 48 for example comprises, on each output of flip-flop 42, an AND gate; the enabling input of one gate is connected to the Q output of divider 46 and the enabling input of the other to the $\bar{Q}$ output of divider 46. An OR gate 53 receives the outputs of the two sets of gates 48 and 49 and applies them to one of the inputs of an acknowledgement register 54. The clock input H of register 54 is connected to receive the pulses from a NOR gate 55. The two inputs of NOR gate 55 are connected to receive signals representative of the input timing of the samples and to receive pulses from generator 43 through an enabling gate 56, respectively. Gate 56 is an AND gate whose enabling input is connected so as to receive the alarm signal from the continuity break detector 26 (FIG. 6).

Register 54 is also connected to the x−1 outputs of multiplexer 47, representing the amplitude of the reconstituted sample.

The system allows nk samples to be created as a substitution for the nk samples missing between sample N and sample N+nk+1. These samples appear during the time interval when the enabling signal is applied to AND gate 56, i.e. between acknowledgements of the arrivals of the Nth and of the N+1th sample.

While particular embodiments of the invention have been described, numerous modified embodiments will be apparent to those familiar with the art. The invention is of use in numerous fields; particularly for transmission of sound signals representative of high quality sounds (monophony or stereophony), of medium quality sounds, of voice of coded sounds, etc. but also in other fields, in particular when the successive samples present therebetween a certain amount of correlation. It should be understood that the scope of the present patent extends to any variation remaining within the scope of the following claims.

We claim:

1. In a digital data communication apparatus including a sender location and a receiver location, a data insertion device located at said sender location, having means for structuring the digital data as multibit words into frames having a fixed length l and each preceded with a frame lock word of identifiable constitution and means for assembling said frames into short packets all have the same predetermined length L, with $L=kl$, where k is a predetermined integer programmed at said sender location and receiver location whereby said lock words have the same location in successive packets.

2. A digital data communication apparatus for data transmission between a sender location and a receiver location, comprising:

a data insertion device at said sender location, having means for structuring the digital data as multibit words into successive frames having a predetermined fixed length l each preceded with a frame lock work having an identifiable constitution, and means for assembling said frames into packets each having a prefix and a useful part, said packet being assembled for the length of the useful parts of said packets to have the same predetermined length L, with $L=kl$, where k is a predetermined integer;

packet switching network means for transmitting said packets from said sender location to said receiver location serially;

and a packet disassembly device at said receiver location including means for recovery of said words.

3. Apparatus according to claim 2, wherein said data insertion device additionally comprises means for inserting a continuity index word into the prefix of each said packet or into the frame locking word of each said frame and for incrementing said index word by one each time a packet or frame is sent and wherein said device at said receiver location includes means for monitoring said index words upon reception of the packets and determining any lack of continuity, whereby loss of packets may be determined.

4. Apparatus according to claim 3, for communication of digital data representing successive samples having some degree of correlation, wherein said device at said receiver location further comprises means for generating substitution data and inserting them in place of the lost data responsive to detection of lacking index words indicating the loss of at least one packet.

5. Apparatus according to claim 4, wherein the means for generating substitution data are arranged to generate said substitution data from the value of the last data received before detection of packet loss and the first data received after recovery.

6. A process for digital data communication through a packet switching network, comprising: structuring the data into successive frames having a predetermined fixed length l; assembling the frames into packets all of them having the same fixed predetermined implicit format with a predetermined length L of the useful part of said packets with $L=kl$, k being a predetermined integer; inserting a continuity index word into the prefix of each packet or into the frame locking word of each frame; incrementing said index word by one each time a new packet or frame is assembled for transmission; transmitting said packets; and monitoring continuity of the index words upon reception of the packets prior to disassembly of the packets, said frames having a random location in said packets.

* * * * *